United States Patent [19]

Wieland et al.

[11] Patent Number: 5,466,767

[45] Date of Patent: Nov. 14, 1995

[54] SHAPED ORGANOSILOXANE POLYCONDENSATES, PROCESS FOR THEIR PREPARATION AND USE

[75] Inventors: Stefan Wieland, Offenbach; Peter Panster, Rodenbach; Horst Grethe, Hanau, all of Germany

[73] Assignee: Degussa Aktiengesellschaft, Frankfurt, Germany

[21] Appl. No.: 340,877

[22] Filed: Nov. 15, 1994

Related U.S. Application Data

[63] Continuation-in-part of Ser. No. 97,197, Jul. 27, 1993, abandoned.

[30] Foreign Application Priority Data

Aug. 6, 1992 [DE] Germany .......................... 42 25 978.9

[51] Int. Cl.⁶ .......................... C08G 77/26; C08G 77/30; C08G 77/22
[52] U.S. Cl. .................. 528/9; 528/30; 528/38
[58] Field of Search .................. 528/30, 9, 38

[56] References Cited

U.S. PATENT DOCUMENTS

| | | | |
|---|---|---|---|
| 4,362,885 | 12/1982 | Panster et al. | 556/446 |
| 4,455,415 | 6/1984 | Panster et al. | 528/39 |
| 4,552,700 | 11/1985 | Panster et al. | 556/9 |
| 4,578,496 | 3/1986 | Panster | 556/479 |
| 4,647,644 | 3/1987 | Panster et al. | 528/30 |
| 4,647,679 | 3/1987 | Panster et al. | 556/9 |
| 4,647,682 | 3/1987 | Panster et al. | 556/431 |
| 4,758,277 | 7/1988 | Spruegel et al. | 106/36 |
| 4,772,457 | 9/1988 | Panster et al. | 423/561 R |
| 4,845,163 | 7/1989 | Panster et al. | 525/475 |
| 4,954,599 | 9/1990 | Panster et al. | 528/38 |
| 4,997,944 | 3/1991 | Zeldin et al. | 546/14 |
| 4,999,413 | 3/1991 | Panster et al. | 528/30 |
| 5,003,024 | 3/1991 | Panster et al. | 528/30 |
| 5,061,773 | 10/1991 | Panster et al. | 528/9 |
| 5,093,451 | 3/1992 | Panster et al. | 528/9 |
| 5,094,831 | 3/1992 | Klockner et al. | 423/342 |
| 5,130,396 | 7/1992 | Panster et al. | 528/9 |
| 5,187,134 | 2/1993 | Panster et al. | 502/158 |
| 5,264,514 | 12/1993 | Panster et al. | 528/9 |

FOREIGN PATENT DOCUMENTS

| | | |
|---|---|---|
| 0072435 | 2/1983 | European Pat. Off. . |
| 0098947 | 1/1984 | European Pat. Off. . |
| 0327795 | 8/1989 | European Pat. Off. . |
| 0367104 | 5/1990 | European Pat. Off. . |
| 0484755 | 5/1992 | European Pat. Off. . |
| 0507132 | 10/1992 | European Pat. Off. . |
| 3837416 | 5/1990 | Germany . |
| 3837418 | 5/1990 | Germany . |
| 3925359 | 2/1991 | Germany . |
| 3925360 | 7/1991 | Germany . |

OTHER PUBLICATIONS

JP 140336 (English language abstract only).
Kawaguchi, T., et al. "Spherial silica gels precipitated from acid catalyzed teos solutions", J. of Non–Crystallin Solid (1990), vol. 121, pp. 383–388.
Espiard, P., et al., "A novel technique for preparing organophilic silica by water–in–oil microemulsions:", Polymer Bulletin (1990), vol. 24, pp. 173–179.

Primary Examiner—Robert E. Sellers
Assistant Examiner—Margaret W. Glass
Attorney, Agent, or Firm—Beveridge, DeGrandi, Weilacher & Young

[57] ABSTRACT

Disclosed are shaped organosiloxane polycondensates in the form of macroscopic spherical particles with a diameter of 0.01 to 2.5 mm, a specific surface area of 0.01 to 1000 m²/g, a specific pore volume of 0.01 to 5 ml/g, and a bulk density of 50 to 1000 g/l, consisting of units of the formula (I):

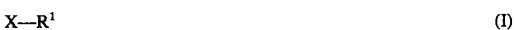

and/or the formula (II):

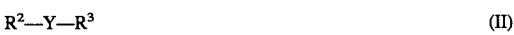

and the formula (III):

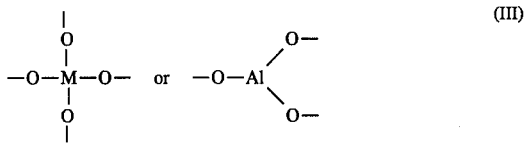

as well as optionally, in addition, units of the formula

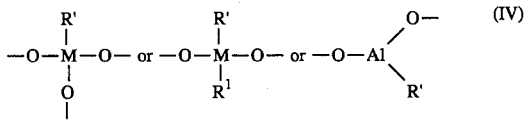

wherein $R^1$ to $R^3$ are identical or different and represent a group of the formula (V):

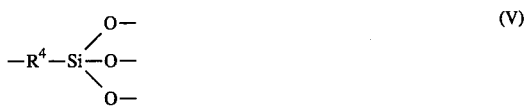

$R^4$ being bonded directly to the X or Y group and representing a linear or branched, fully saturated or unsaturated alkylene group, a cycloalkylene group, a phenylene group or a unit of the formula

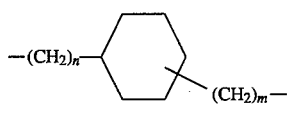

or

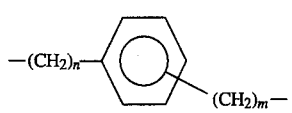

and M corresponding to a Si, Ti or Zr atom. Also disclosed are a process for preparation and use.

24 Claims, No Drawings

SHAPED ORGANOSILOXANE POLYCONDENSATES, PROCESS FOR THEIR PREPARATION AND USE

REFERENCE TO A RELATED APPLICATION

This is a continuation-in-part of our U.S. application Ser. No. 08/097,197 filed Jul. 27, 1993, now abandoned.

BACKGROUND AND INTRODUCTION

The present invention relates to shaped organo-functional polysiloxanes, with one or more functional or non-functional siloxane units, which have the applicational and technical advantages of a macroscopic spherical shape and, unlike organosiloxanamine copolycondensates already described (DE 39 25 359 corresponding to U.S. patent application Ser. No. 07/556,486 filed on Jul. 24, 1990, DE 39 25 360 corresponding to U.S. Pat. No. 5,093,451 which is incorporated by reference; DE 38 37 416 corresponding to U.S. Pat. No. 4,999,413 which is incorporated by reference; and DE 38 37 418 corresponding to U.S. Pat. No. 5,003,024 which is incorporated by reference), do not contain components of the $NR_3$ (with $R=R'—SiO_{3/2}$) type.

The present invention also relates to processes for the preparation of the new products in particle sizes which are ideal for the application being considered and with the currently appropriate physical properties and to applications for these novel materials.

An unshaped polymeric organosiloxane powder or organosiloxane gels, which are obtainable by precipitation with a base (e.g., ammonia) are known and these are mechanically crushed after hardening and are available as particulate materials.

Use of the corresponding polysiloxanes, for example in stirred reactors, is connected with a considerable amount of friction and associated technical problems. Accessibility of organic functions on and in the polysiloxane structure is very poor due to unfavorable porosity or a lack of porosity.

Spherical organosiloxanes or silica gels are also known with particle sizes, however, in the region of a few micrometers. (Kawaguchi, T., and K. Oho, J. Non-Cryst. Solids (1990), volume 121, pages 383–388; Espinard, P., J. E. Mark, and A. Guyot, Polym. Bull. (Berlin)(1990), volume 24, pages 173–179; Jap. Kokai Tokkyo Koho/02225328 A 2). In this case, the fundamental methods of preparation are based on precipitation of siloxanes. Larger spherical particles could not be produced using this method, mainly due to process restrictions. As a standard feature, the particles size achieved is in the range from 1 to at most 10 micrometers.

Known (but not previously published) are methods for the preparation of metal-containing organosiloxanamine copolycondensates in the form of spherical particles with a diameter of 0.01 to 3.0 mm (DE-PS 41 10 705 corresponding to U.S. patent application Ser. No. 07/860,715 filed on Apr. 1, 1992, now U.S. Pat. No. 5,264,514, which is incorporated by reference). In the case of these products, the organosilanamine fulfills the task of a subsequent stabilizing siloxane component, and also of a catalyst for the hydrolysis and polycondensation reaction.

Known formed, spherical, polymeric metal complexes of iron, cobalt, nickel, ruthenium, lrhodium, palladium, osmium, iridium and/or platinum are disclosed in U.S. Pat. No. 5,187,134. The process of producing such complexes involves the reaction of hydrous or anhydrous compounds of iron, cobalt, nickel, ruthenium, rhodium, palladium, osmium, iridium and/or platinum with the components of the organosiloxane (e.g., the phosphene); in the examples the hydrous or anhydrous metal compounds are always initially reacted with the phosphene compound. Thus, the metals are inherently distributed uniformly throughout the particles.

SUMMARY OF THE INVENTION

An object of the present invention is to provide shaped organosiloxane polycondensates, consisting of units of the formula

  (I)

and/or the formula

  (II)

and of the formula

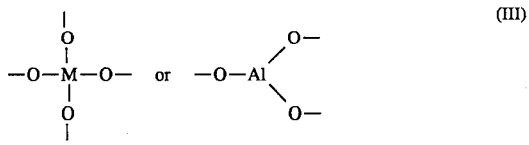  (III)

as well as optionally in addition of units of the formula

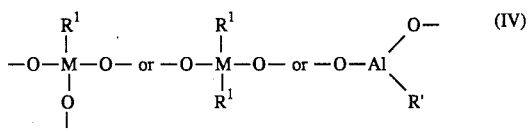  (IV)

in which the ratios of (I) to (III) are in the range from 95 to 5 to 5 to 95 mol %, preferably from 50 to 50 to 10 to 90 mol %, or (II) to (III) or the sum of (I) plus (II) to (III) are 100 to 0 to 5 to 95 mol %, preferably from 90 to 10 to 10 to 90 mol %, and with ratios of the sum of (I) , (II) and (III) to (IV) of 100 to 0 to 50 to 50 mol %, wherein $R^1$ to $R^3$ are identical or different and represent a group of the formula

  (V)

$R^4$ being bonded directly to the group X or Y and representing a linear or branched, fully saturated or unsaturated alkylene group with 1 to 10 carbon atoms, a cycloalkylene group with 5 to 8 carbon atoms, a phenylene group or a unit of the formula

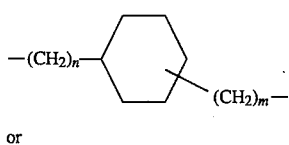

or

-continued

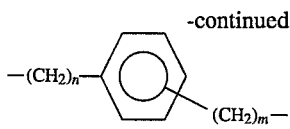

in which n is a number from 1 to 6 and gives the number of methylene groups adjacent to X or Y and m is a number from 0 to 6, wherein M is a Si, Ti or Zr atom and R' is a linear or branched alkyl group with 1 to 5 carbon atoms or a phenyl group and X in formula (I) represents —H, —Cl, —Br, —I, —CN, —SCN, —$N_3$, —OR", —SH —COOH, —P($C_6H_5$)$_2$, —$NH_2$, —N($CH_3$)$_2$, —N($C_2H_5$)$_2$, —NH—($CH_2$)$_2$—$NH_2$, —NH—($CH_2$)$_2$—NH—($CH_2$)$_2$—$NH_2$, —NH—C(S)—$NR_2$", —NH—C(O)—$NR_2$", —NR"—C(S)—$NR_2$", —O—C(O)—C($CH_3$)=$CH_2$, —CH=$CH_2$, —$CH_2$—CH=$CH_2$, $CH_2$—$CH_2$—CH=$CH_2$, or

and Y in formula ( II ) represents

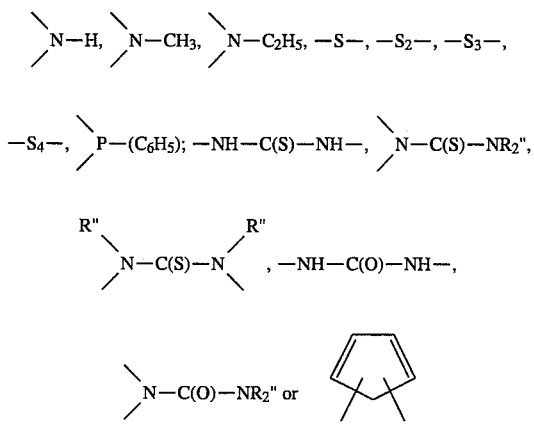

wherein R" is H or a linear or branched alkyl group with 1 to 5 carbon atoms, in the form of spherical particles with a diameter of 0.01 to 2.5 mm (preferably 0.05 to 1.5 mm), a specific surface area of 0.01 to 1000 $m^2$/g (particularly 50 to 800 $m^2$/g), a specific pore volume of 0.01 to 5 ml/g, and a bulk density of 50 to 1000 g/l, particularly 100 to 800 g/l.

Another object of the present invention is to provide a process for the preparation of shaped random organosiloxane polycondensates described above, characterized in that components of the formulas (VI) to (VIII)

$$X-R^5 \qquad (VI)$$

$$R^6-Y-R^7 \qquad (VII),$$

$$M(OR^8)_{2-4}R'_{0-2}$$

or $$Al(OR^8)_{2-3}R'_{0-1} \qquad (VIII)$$

corresponding to the stoichiometric composition of the polysiloxane being prepared, wherein $R^5$ to $R^7$ are identical or different and each represents a group of the formula (IX)

$$-R^4-Si(OR^9)_3 \qquad (IX)$$

X, Y, R', M and $R^4$ are each defined as in the formulas (I) to (V) above and $R^8$ and $R^9$ represent a linear or branched alkyl group with 1 to 5 carbon atoms, are dissolved in a solvent which is predominantly water-miscible but dissolves the silane components, an amount of water which is at least sufficient for complete hydrolysis and condensation as well as optionally a hydrolysis and condensation catalyst from the list HCl, $H_3PO_4$, $CH_3COOH$, $NH_3$, $NR_3$, $NR_3$''', wherein R''' represents an alkyl group which contains 1 to 6 carbon atoms, as the pure substance or in aqueous solution, is added to the solution with stirring, then the reaction mixture is allowed to gel with further stirring at a specific temperature in the range from room temperature to 200° C., and at the start of gelling or up to one hour afterwards 10 to 2000, preferably 50 to 500% by weight, with reference to the total amount of silane components used, of a predominantly water-immiscible solvent, but one which dissolves and dilutes the gelled reaction mixture, is added, homogenized and immediately or within a time interval of up to 3 hours later, optionally increasing the originally fixed temperature, 10 to 2000% by weight, preferably 5 to 500% by weight, with reference to the total amount of silane components used, of water is added, the siloxane-containing organic phase is dispersed in the liquid two-phase system and the solid which is formed after hardening of the droplets in the shape of spheres is separated from the liquid phase after a sufficient reaction time, at room temperature to 250° C., optionally purified by extraction, optionally dried at room temperature to 250° C., optionally under a protective gas or under vacuum, and then optionally annealed and/or classified.

As will be apparent from the above description of the products and processes of the present invention, no polymeric metal complexes of iron, cobalt, nickel, ruthenium, rhodium, palladium, osmium, iridium and/or platinum are described or produced by the invention herein.

DETAILED DESCRIPTION OF THE INVENTION

Solid, shaped and well-defined products are obtained within the ranges described above. There are no problems with regard to the relevant morphological, physical properties (i.e., the porosity), or chemical stability.

In a particular embodiment, the polycondensates are present as random polycondensates, block polycondensates or mixed polycondensates. Preferably, $R^1$, $R^2$ and $R^3$ are defined as

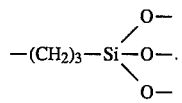

The suitable chemical composition of the polycondensates according to the present invention depends mainly on their intended use. Depending on the desired application, a suitable density of functional groups is selected by varying the proportion of components of the formulas (I) and (II) and of components with the formulas (III) and (IV), which serve to cross-link the polysiloxane matrix and also to produce suitable physical properties, without impairing the intended mode of action by means of the organo-functional groups which are incorporated.

The following compounds, which are in principle known, may be used successfully, for instance, as monomeric units for the shaped organosiloxane polycondensates:

Cl—CH$_2$CH$_2$CH$_2$Si(OC$_2$H$_5$)$_3$
NCS—CH$_2$CH$_2$CH$_2$Si(OC$_2$H$_5$)$_3$
NC—CH$_2$CH$_2$Ch$_2$Si(OCH$_3$)$_3$
CH$_2$=CHSi(OCH$_3$)$_3$
C$_6$H$_5$Si(OC$_2$H$_5$)$_3$
S(CH$_2$CH$_2$CH$_2$Si(OCH$_3$)$_3$)$_2$
HN((CH$_2$)$_{10}$Si(OC$_2$H$_5$)$_3$)$_2$
Si(OC$_2$H$_5$)$_4$
Ti(OC$_3$H$_7$)$_4$
(H$_5$C$_2$O)$_2$Si(CH$_2$)$_2$.

As can also be seen from the examples, the particle size distribution, specific surface area, bulk density and thus also the porosity can be set selectively within wide limits. Preferably, the shaped organosiloxane polycondensates have a specific surface area of 50 to 800 m$^2$/g, have a bulk density of 100 to 800 g/l, and the particles have a diameter of 0.05 to 1.5 mm.

In general, random polycondensates are produced but it is also possible, using selective pre-condensation, to obtain random polycondensates, block polycondensates or mixed polycondensates.

For technical reasons, and also because of the ready availability of the corresponding starting silanes, a C$_3$ spacer group is preferred between the silicon atom and the organic functional group.

A process for preparing random polycondensates in spherical form is characterized in that components of the formulas (VI) to (VIII)

$$X-R^5 \qquad (VI),$$

$$R^6-Y-R^7 \qquad (VII),$$

$$M(OR^8)_{2-4}R'_{0-2}$$

or $$Al(OR^8)_{2-3}R'_{0-1} \qquad (VIII)$$

corresponding to the stoichiometric composition of the polysiloxane being prepared, wherein R$^5$ to R$^7$ are identical or different and each represents a group of the formula (IX)

$$-R^4-Si(OR^9)_3 \qquad (IX)$$

X, Y, R', M and R$^4$ are each defined as in the formulas (I) to (V) and R$^8$ and R$^9$ represent a linear or branched alkyl group with 1 to 5 carbon atoms, are dissolved in a solvent which is predominantly water-miscible but dissolves the silane components, an amount of water which is at least sufficient for complete hydrolysis and condensation as well as optionally a hydrolysis and condensation catalyst from the list HCl, H$_3$PO$_4$, CH$_3$COOH, NH$_3$, NR$_3$''', wherein R''' represents an alkyl group which contains 1 to 6 carbon atoms, as the pure substance or in aqueous solution, is added to the solution with stirring, then the reaction mixture is allowed to gel with further stirring at a specific temperature in the range from room temperature to 200° C., and at the start of gelling or up to one hour afterwards 10 to 2000, preferably 50 to 500% by weight, with reference to the total amount of silane components used, of a predominantly water-immiscible solvent, but one which dissolves and dilutes the gelled reaction mixture, is added, homogenized and immediately or within a time interval of up to 3 hours later, optionally increasing the originally fixed temperature, 10 to 2000% by weight, preferably 50 to 500% by weight, with reference to the total amount of silane components used, of water is added, the siloxane-containing organic phase is dispersed in the liquid two-phase system and the solid which is formed after hardening of the droplets in the shape of spheres is separated from the liquid phase after a sufficient reaction time, at room temperature to 250° C., optionally purified by extraction, optionally dried at room temperature to 250° C., optionally under a protective gas or under vacuum, and then optionally annealed and/or classified.

In principle, the corresponding halide or phenoxy compounds may also be used as starting materials for the process instead of alkoxysilyl compounds, but their use does not offer any advantages and may, for example in the case of the chlorides, cause difficulties as a result of hydrochloric acid being released during hydrolysis.

Hydrolysis of the starting materials and optional cross-linking agent must be performed in a solvent which is predominantly water-miscible but which dissolves the starting materials. Preferably, alcohols are used which correspond to the alkoxy grouping in the monomeric precursor of the starting material or to the metal atoms in the optionally used cross-linking agent. Particularly suitable are methanol, ethanol, n- and i-propanol, n- and i-butanol or n-pentanol. Mixtures of such alcohols may also be used as the solvent for hydrolysis. Instead of alcohols, other polar solvents which are predominantly water-miscible may also be used, but it has been shown that this is not as sensible from a technical point of view due to the solvent mixture which is produced with the hydrolytically eliminated alcohol.

Preferably, the hydrolysis is performed with an excess of water as compared with the stoichiometrically required amount. The amount of water required for hydrolysis depends on the rate of hydrolysis of each organosilane or cross-linking agent used in such a way that hydrolysis takes place more rapidly with increasing amounts of water. An upper limit can be set, however, by the occurrence of demixing and the formation of a two-phase system. Basically, hydrolysis in homogeneous solution is preferred.

On the basis of the two aspects mentioned, in practice somewhat less water, with respect to the weight, is used than organosilanes plus cross-linking agent.

The duration of hydrolysis depends on the tendency to hydrolyze of the starting material and/or cross-linking agent and on the temperature. The readiness to hydrolyze and thus the rate of hydrolysis depends in particular on the type of alkoxy groups adjacent to the silicon or titanium, zirconium or aluminum atoms, wherein methoxy groups are hydrolyzed the most rapidly, and there is a slowing down with increasing chain length of the hydrocarbon group. In addition, the duration of the total hydrolysis and polycondensation procedure also depends on the basicity of the organosilane. Hydrolysis and polycondensation may be accelerated by the addition of bases, preferably ammonia, or of inorganic or organic acids, or else by known condensation catalysts such as dibutyltin diacetate.

Basically, all Bransted acids and bases may also be considered as catalysts. Preventing precipitation of siloxanes causes many technical difficulties when performing the reaction and selecting the type and concentration of catalyst. It was surprisingly found that it was possible to prepare spherical products according to the method of the present invention, even though acid or base catalyzed hydrolysis of organosilanes is known and is used in many different ways to prepare unshaped polysiloxanes with undefined physical properties.

The requirement of keeping the starting material, which is cross-linked with water and dissolved in solvent, at a certain temperature while still being stirred results in the rate of polycondensation (which is signalled by gelling) being temperature dependent.

The temperature to be applied during hydrolysis or the gelling phase is established empirically for individual cases. It should be noted here that a fluid, gel-like material which contains no solids is retained for the subsequent process step, the so-called shaping phase.

The shaping phase, accompanied by the transfer of the coherent fluid, gel-like mass (in which the condensation reaction continues further) into separate spherical particles, starts with the addition to the on going gelling reaction mixture of a predominantly water-insoluble solvent in the designated amount (but one which dissolves the reaction mixture adequately).

Suitable solvents are, for example, linear or branched alcohols with 4 to 18 carbon atoms or phenols, linear or branched symmetric or asymmetric dialkyl ethers and di- or tri-ethers (such as ethyleneglycol-dimethyl ether), chlorinated or fluorinated hydrocarbons, aromatic compounds or mixtures of aromatic compounds substituted with one or more alkyl groups (e.g., toluene or xylene), and symmetric and asymmetric ketones which are predominantly immiscible with water.

Preferably, however, a linear or branched alcohol with 4 to 12 carbon atoms, toluene or o-, m- or p-xylene, separately or as a mixture, is added to the on going gelling reaction mixture.

This addition of a solvent causes a dilution effect after homogenization with the reaction mixture and thus causes a definite slowing down in the condensation reaction being accompanied by an increase in viscosity.

Assessment of the amount of this solvent used in the shaping phase depends in particular on what particle size is being sought for each shaped organosiloxane compound. A rule of thumb which may be applied is that less has to be used for coarse particles (spheres with a larger diameter) and more for fine particles (spheres with a smaller diameter).

In addition, the intensity with which the viscous homogeneous mixture (consisting of reaction mixture and predominantly water-insoluble solvent) is dispersed in the extra water added as dispersion agent in the shaping phase also has a large effect on the particle size. The formation of a finer particle range is regularly encouraged by vigorous stirring. One of the known dispersion-aiding agents, such as long-chain carboxylic acids or their salts or polyalkylene glycols, may be used in the normal concentrations to stabilize the aqueous dispersion of the organic phase (now containing siloxane).

According to one variant of the process according to the present invention, some or even the whole amount of the predominantly water-insoluble solvent being added at or after the start of gelling is used in the hydrolysis step alongside the solvent used there. If only some is added, the residue is added after the start of gelling.

In the extreme case, addition of the whole amount, the dispersion agent water may be added at or after the start of gelling. This variant is preferred when the organosilane and optional cross-linking agent mixture used exhibits an extraordinarily high tendency towards hydrolysis and polycondensation.

The preferred temperature at which dispersion of the siloxane-containing organic phase in the aqueous phase is performed and spherical solids are formed from the dispersed phase is generally the reflux temperature of the whole mixture. Basically, however, the same temperatures as those used in the gelling steps may be applied. The total duration of the dispersion step and after-reaction is generally 0.5 to 10 hours.

Both gelling and shaping may be performed at atmospheric pressure or at an excess pressure which corresponds to the sum of the partial pressures of the components of the reaction mixture at the particular temperature being applied.

When preparing the shaped, cross-linked or non-crosslinked organosiloxanes according to the present invention, this also being independent of the type of alkoxy group, it may so happen that one or more components in the mixture to be gelled has a different hydrolysis and polycondensation behavior. In this case one version of the process according to the present invention provides for the cross-linking agent(s) and/or the organo-functional silane not to be subjected to the gelling process together, but to be gelled separately first, to homogenize them with the predominantly water-insoluble solvent and only then to add the cross-linking agent(s) or organosilane to the homogeneous mixture.

However, the solvent and the silane component which is still missing may also be added simultaneously to the gelled mix.

Separation of the spherical shaped moist product from the liquid dispersion agent may be performed using measures known in the art (e.g., decanting, filtering or centrifuging).

The liquid phase may also be removed from the reactor, the solids remaining behind being treated once or several times with a low-boiling extraction agent, preferably in a low-boiling alcohol, in order to facilitate subsequent drying of the shaped material by at least partially exchanging the mostly relatively high-boiling solvent from the shaping phase for the low-boiling extraction agent.

Drying may be performed basically at room temperature to 250° C., optionally under a protective gas or under vacuum. The dried, shaped solids may be annealed at temperatures of 150° to 300° C. to harden and stabilize them.

The dried or annealed product may be classified into various particle size fractions in devices known in the art. One or more of the working-up measures of extracting, drying, annealing and classifying may be omitted, depending on the circumstances. Classification may be performed with the liquid-moist, dried or annealed product.

In order to compensate for different hydrolysis and polycondensation behavior by the monomeric components in a random, optionally cross-linked, copolycondensate, the monomeric components with the formulas (V) and (VIII) could be initially pre-condensed.

A particularly important embodiment of the process according to the process invention provides for subjecting the still solvent- and water-moist or -wet spherical material to a thermal treatment for 1 hour to one week at temperatures of 50°–300° C., preferably 100°–200° C., wherein excess pressure may be applied if so required.

This treatment under "vaporizing" or digesting conditions also predominantly serves to improve the mechanical strength and porosity of the shaped material and may also be performed in the dispersion which is obtained last in the preparation process, which contains a liquid and the solid product phase, or in water on its own.

The previously described embodiment of an after-treatment of the shaped, but not dried, organosiloxane copolycondensate which is obtained thus comprises subjecting the solid produced in the form of spheres, in the presence of at least the component water or of the liquid phase which was present last in the preparation process as a vapor or a liquid, to a thermal treatment for 1 hour to one week at temperatures of 50°–300° C., preferably 100°–200° C., optionally under excess pressure. The presence of an acid, basic or metal-containing catalyst may be of advantage here. A particularly advantageous embodiment provides for the use of ammonia.

The novel, shaped organosiloxane copolycondensates are characterized in particular by using the quantitative hydrolysis yields, by elemental analyses and by the determination of the individual functional groups.

Purely optically, there is no difference between the copolycondensates obtained by the different methods of preparation. Depending on preliminary treatment, the spherically shaped copolycondensates according to the present invention have a particle diameter of 0.01 to 2.5 mm (preferably 0.05 to 1.5 mm), a specific surface area of 0.01 to 1000 $m^2/g$ (preferably 150 to 800 $m^2/g$), a specific pore volume of 0.01 to 5 ml/g, and a bulk density of 50 to 1000 g/l (preferably 100 to 800 g/l). The adjustable pore diameters are in the range 0.01 to more than 1000 nm.

Specific control of synthesis permits the preparation of products in the most technically applicable spherical shape and with the desired physical and morphological properties.

It is inherent from the foregoing and from the examples herein that the products and processes of the present invention do not involve the preparation of formed, spherical, polymeric metal complexes of iron, cobalt, nickel, ruthenium, rhodium, palladium, osmium, iridium and/or platinum formed from the reaction of hydrous or anhydrous compounds of iron, cobalt, nickel, ruthenium, rhodium, palladium, osmium, iridium and/or platinum with the components of the organosiloxane. The compound of Formula II above (e.g., where Y is a phenyl phosphene) is not reacted with such hydrous or anhydrous metal compounds. Thus, in contrast to the product of U.S. Pat. No. 5,187,134, such metals are not uniformly distributed throughout the body of the composition in the present invention. In contrast, with the present invention, applying the metals after formation of the spherical polycondensates of the present invention results in spherical particles with a concentration gradient; i.e., a concentration of metals which decrease from the surface of the particle to the interior of the body (i.e., there is no uniform distribution of the metals throughout the body).

The spherical polycondensates may be used, optionally after further additional chemical modification, as active substance carriers in general or else as carriers for the preparation of noble metal catalysts.

Applying the metals in a conventional manner after formation of the spherical polycondensates of the present invention results in a concentration gradient of metals which decreases from the surface to the interior of the body (i.e., there is no uniform distribution of the metals throughout the body).

A further use of all the copolycondensates according to the present invention is use for the adsorptive bonding of gaseous organic compounds and/or water vapor, preferably of organic solvents.

It is in particular the pore volume, pore diameter, and surface properties which are critical for this adsorptive action.

These factors may be affected, on the one hand, by the methods of preparation and after-treatment according to the present invention and, on the other hand, also by the chemical composition (e.g., by the incorporation of hydrophobic cross-linking groups in the polysiloxane structure). Recovery of the adsorbed organic compounds or water is readily achieved by raising the temperature and/or by flushing out with warm air.

In the following, the invention is explained in more detail by using working examples:

EXAMPLE 1

383.8 g of $Si(OC_2H_5)_4$ are introduced into a three liter double-walled glass vessel together with 500 ml of ethanol and 100 ml of 1-octanol and heated to 80° C. with stirring. 125 ml of water (pH=4.0) are added, the mix is cooled to 60° C. and 0.1 ml of tributylamine is added. The mix itself is maintained at a temperature of 60° C. with slow stirring. After 20 minutes the mix gels (i.e., the viscosity increases noticeably). The rate of stirring is immediately increased (600 rpm) and 116.2 g of $NC-CH_2CH_2CH_2-Si(OCH_3)_3$, dissolved in 400 ml of octanol, are added. 1500 ml of water (50° C.) are added to the homogeneous solution after 10 minutes and the organic solution is dispersed in the water. The emulsion which is present is heated and boiled under reflux for two hours. After cooling the mix, the solid which is produced is filtered off under suction and extracted three times with ethanol. The product is dried at 150° C. for 24 hours under $N_2$. After classifying the solid, 177 g (95.9% of theory) of product are obtained in the form of a solid with spherical particles in the particle size range from 0.1 to 0.6 mm (of which 65% is in the range from 0.2 to 0.4 mm) and with the composition $NC-(CH_2)_3-SiO_{3/2}3SiO_2$.

| Elemental analysis: | % C | % H | % N | % Si |
|---|---|---|---|---|
| Theory: | 15.9 | 2.0 | 4.6 | 37.4 |
| Found: | 14 | 2.3 | 3.2 | 35.7 |
| Bulk density: | | 683 g/l (anhydrous) | | |

EXAMPLE 2

After extraction with ethanol, the product prepared in the same way as in example 1 is first subjected to a hydrothermal treatment at 150° C. in 5% aqueous ammonia solution (24 hours) and then dried as in example 1. A solid is obtained as in example 1, but with a bulk density of 405 g/l.

EXAMPLE 3

138.8 g of $S(CH_2CH_2CH_2Si(OCH_3)_3)_2$ and 161.2 g of $Si(OC_2H_5)_4$ are initially introduced into a three liter double-walled glass vessel together with 300 ml of ethanol and 120 ml of 1-octanol and heated to 75° C. with stirring. 49 g of $NH_3$ solution (25% by weight in water) and 55 ml of distilled water are added and the mix is cooled to 70° C. After five minutes the mix gels, the rate of stirring is immediately increased (600 rpm) and 240 ml of octanol are added. 900 ml of water (50° C.) are immediately added to the homogeneous solution and the organic phase is dispersed in the water. The emulsion which is present is heated and boiled under reflux for two hours. The mix is filtered under suction, 5% strength $NH_3$ solution is added to the isolated solid and stirred in a laboratory autoclave at 150° C. for 24 hours. After cooling the mix, the solid which is produced is filtered off under suction and extracted three times with ethanol, with stirring.

The product is dried under $N_2$ for four hours at 60° C., for four hours at 90° C., for four hours at 120° C., and finally for 12 hours at 150° C. After classifying the solid, 101 g of product in the form of a solid with spherical particles in the particle size range from 0.3 to 0.8 mm and the composition $S((CH_2)_3-SiO_{3/2}2SiO_2)_2$ are obtained.

| Elemental analysis: | % C | % H | % S | % Si |
|---|---|---|---|---|
| Theory: | 21.2 | 3.6 | 9.4 | 32.9 |
| Found: | 23 | 4.1 | 9.9 | 30.7 |

-continued

| Elemental analysis: | % C | % H | % S | % Si |
|---|---|---|---|---|
| Bulk density: | | 164 g/l (anhydrous) | | |

EXAMPLE 4

62.4 g of $CH_3CH_2CH_2Si(OCH_3)_3$ and 237.6 g of $Si(OC_2H_5)_4$ are initially introduced into a three liter double-walled glass vessel together with 300 ml of ethanol and heated to 80° C. with stirring. 71 g of HCl solution (37% by weight in water) and 90 ml of distilled water are added stepwise, the mix is boiled under reflux for two hours and then cooled to 70° C. After 15 minutes the mix gels, the rate of stirring is immediately increased (600 rpm) and after one minute 300 ml of octanol are added. After another one minute 900 ml of water (50° C.) are added to the homogeneous solution and the organic phase is dispersed in the water. The emulsion which is present is heated and boiled under reflux for two hours.

The mix is filtered under suction, 5% strength $NH_3$ solution is added to the isolated solid and stirred in a laboratory autoclave at 150° C. for 24 hours.

After cooling the mix, the solid which is produced is filtered off under suction and extracted three times with ethanol, with stirring.

The product is dried under $N_2$ for four hours at 60° C., for four hours at 90° C., for four hours at 120° C., and finally for 12 hours at 150° C. After classification of the solid, 92 g of product, in the form of a solid with spherical particles in the particle size range from 0.1 to 0.8 mm and the composition $CH_2CH_2CH_2$—$SiO_{3/2}3SiO_2$ are obtained.

| Elemental analysis: | % C | % H | % Si |
|---|---|---|---|
| Theory: | 13.1 | 2.6 | 40.8 |
| Found: | 13.0 | 2.8 | 39.7 |
| Bulk density: | 240 g/l (anhydrous) | | |

EXAMPLE 5

60.6 g of $NCS—CH_2CH_2CH_2Si(OC_2H_5)_3$ and 239.5 g of $Si(OC_2H_5)_4$ are initially introduced into a three liter double-walled glass vessel together with 300 ml of ethanol and heated to 80° C. with stirring. 71 g of HCl solution (37% by weight in water) and 45 ml of distilled water are added stepwise, the mix is boiled under reflux for 40 minutes, then cooled to 70° C. After 215 minutes the mix gels, the rate of stirring is immediately increased (600 rpm) and after one minute 300 ml of octanol are added. After five minutes, 900 ml of water (50° C.) are added to the homogeneous solution and the organic phase is dispersed in the water. The emulsion which is present is heated and boiled for two hours under reflux.

After working-up in the same way as in example 4, a shaped polysiloxane with the composition $NCS—CH_2CH_2CH_2—SiO_{3/2}\ 5SiO_2$ was obtained.

EXAMPLE 6

57.8 g of $CH_2{=}CH_2Si(OCH_3)_3$ and 242.2 g of $Si(OC_2H_5)_4$ are initially introduced into a three liter double-walled glass vessel together with 300 ml of ethanol and 120 ml of 1-octanol and heated to 80° C. with stirring. 75 ml of water (pH=4.0) are added, the mix is cooled to 70° C. and 2.0 ml of triethylamine are added. The mix itself is kept at a temperature of 60° C. with slow stirring. After 15 minutes, the mix gels, the rate of stirring is immediately increased (600 rpm) and 240 ml of octanol are added. 900 ml of water (50° C.) are immediately added to the homogeneous solution and the organic phase is dispersed in the water. Further working-up is performed in the same way as in example 1. A shaped polysiloxane with the following composition was obtained: $CH_2{=}CH_2—SiO_{3/2}3SiO_2$.

EXAMPLE 7

81.9 g of $C_8H_{17}Si(OCH_3)_3$ and 218.2 g of $Si(OC_2H_5)_4$ were reacted in precisely the same way as described in example 6 and a shaped polysiloxane of the composition $C_8H_{17}SiO_{3/2}3SiO_2$ was obtained.

EXAMPLE 8

In the same way as in example 6, 73.1 g of phenyltriethoxysilane and 226.9 g of polydiethyl silicate 40 (precondensed tetraethoxysilane, corresponding to 40% $SiO_2$ content) were reacted and a product with the composition $C_6H_5SiO_{3/2}5SiO_2$ was obtained.

| Sieve analysis: | 0.2–0.3 mm: 31% |
|---|---|
| | 0.3–0.6 mm: 59% |
| | 0.6–0.8 mm: 10% |
| BET surface area: | 642 m²/g |
| Mesopores (2–30 nm): | 0.72 ml/g |
| Macropores: | 0.84 ml/g |

EXAMPLE 9

In the same way as in example 6, 26.9 g of propyltrimethoxysilane and 273.1 g of tetraethoxysilane were reacted and a product with the composition $C_3H_7Si_{3/2}8SiO_2$ was obtained.
BET surface area: 784 m²/g
Mesopores (2–30 nm): 0.48 ml/g
Macropores: 1.24 ml/g
Bulk density: 390 g/l

EXAMPLE 10

The polysiloxane obtained in example 9 was stirred with 5% $NH_3$ solution before drying for 24 hours at 150° C.
BET surface area: 491 m²/g
Mesopores (2–30 nm): 1.81 ml/g
Macropores: 3.35 ml/g
Bulk density: 192 g/l

EXAMPLE 11

In the same way as in example 6, 83.44 g of chloropropyltriethoxysilane and 216.6 g of tetraethoxysilane were reacted and a shaped polysiloxane with the composition $Cl—CH_2CH_2CH_2SiO_{3/2}3SiO_2$ was obtained.
Chlorine content: 10.4% by wt. (Theory: 11.4% by wt.)
Spec. surface area: 649 m²/g
Micropores (<2 nm): 0.42 ml/g
Mesopores (2–30 nm): 0.02 ml/g
Macropores: 0.75 ml/g
Bulk density: 545 g/l

EXAMPLE 12

In the same way as in example 6, but using one ml of triethylamine, 50.9 g of HN(CH$_2$CH$_2$CH$_2$Si(OC$_2$H$_5$)$_3$)$_2$ and 249.1 g of tetraethoxysilane were reacted and a shaped polysiloxane with the composition HN(CH$_2$CH$_2$CH$_2$SiO$_{3/2}$)$_2$($_2$10SiO$_2$ was obtained.

Spec. surface area: 112 m$^2$/g
Mesopores (2–30 nm): 0.22 ml/g
Macropores: 4.47 ml/g
Bulk density: 167 g/l It is clear from the foregoing examples that no reactions involving hydrous or anhydrous compounds of iron, cobalt, nickel, ruthenium, rhodium, palladium, osmium, iridium and/or platinum with the components of the organosiloxane take place in accordance with the present invention. Furthermore, no metal compounds of the type disclosed in U.S. Pat. No. 5,187,134 are present in the final products produced by the method of this invention.

Further variations and modifications of the foregoing will be apparent to those skilled in the art and such variations and modifications are attended to be encompassed by the claims that are appended hereto.

What is claimed:

1. A shaped organosiloxane polycondensate comprising units of the formula (I):

X—R$^1$      (I)

and/or the formula (II):

R$^2$—Y—R$^3$      (II);

and the formula (III):

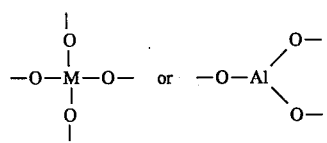
(III)

and optionally units of the formula (IV):

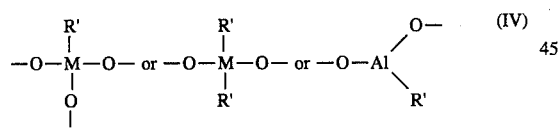
(IV)

in which the ratios (I):(III) are in the range from 95:5 to 5:95 mol % or (II):(III) or the sum of (I) plus (II):(III) are from 90:10 to 10:90 mol % and with the ratio of the sum of (I), (II) and (III):(IV) of 100:0 to 50:50 mol %, wherein R$^1$ to R$^3$ are identical or different and represent a group of the formula (V):

(V)

R$^4$ being bonded directly to the group X or Y and representing a linear or branched, fully saturated or unsaturated alkylene group with 1 to 10 carbon atoms, a cycloalkylene group with 5 to 8 carbon atoms, a phenylene group or a unit of the formula

or

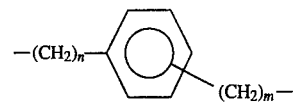

in which n is a number from 1 to 6 and represents the number of methylene groups adjacent to X or Y, and m is a number from 0 to 6, wherein M is a Si, Ti or Zr atom, and R' is a linear or branched alkyl group with 1 to 5 carbon atoms or a phenyl group, and X in formula (I) represents —H, —Cl, —Br, —I, —CN, —SCN, —N$_3$, —OR",
—SH, —COOH, —P(C$_6$H$_5$)$_2$, —NH$_2$, —N(CH$_3$)$_2$,
—N(C$_2$H$_5$)$_2$, —NH—(CH$_2$)$_2$—NH$_2$, —NH—
(CH$_2$)$_2$—NH—(CH$_2$)$_2$—NH$_2$, —NH—C(S)—NR$_2$",
—NH—C(O)—NR$_2$", —NR"—C(S)—NR$_2$",
—O—C(O)—C(CH$_3$)=CH$_2$—CH=CH$_2$, —CH$_2$—
CH=CH$_2$, —CH$_2$—CH$_2$—CH=CH$_2$, or

and Y in formula (II) represents

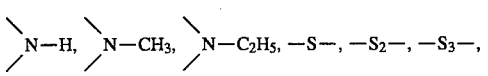

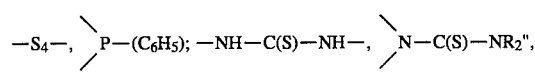

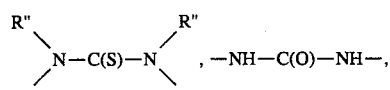

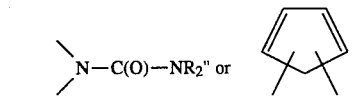

wherein R" is H or represents a linear or branched alkyl group with 1 to 5 carbon atoms, wherein said shaped organosiloxane polycondensate is a macroscopic spherical particle with a diameter of 0.01 to 2.5 mm, a specific surface area of 0.01 to 1000 m$^2$/g, a specific pore volume of 0.01 to 5 ml/g, and a bulk density of 50 to 1000 g/l;

with the provisio that said shaped organosiloxane polycondensate is not a formed, spherical, polymeric metal complex of iron, cobalt, nickel, ruthenium, rhodium, palladium, osmium, iridium and/or platinum formed from the reaction of hydrous or anhydrous compounds of iron, cobalt, nickel, ruthenium, rhodium, palladium, osmium, iridium and/or platinum with the components of the organosiloxane; and with the provisio that said shaped organosiloxane polycondensate does not contain components of $NR_3$ wherein the R groups are identical or different and represent a group of the formula:

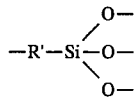

R' being bonded directly to the nitrogen atom and represents a linear or branched alkylene group with 1 to 10 carbon atoms, a cycloalkylene group with 5 to 8 carbon atoms, or a unit of the formula

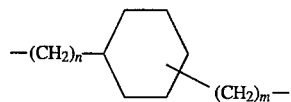

or

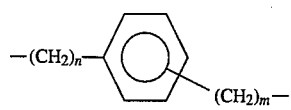

in which n is a number from 1 to 6 and represents the number of methylene groups bonded to nitrogen and m is a number from 0 to 6.

2. The shaped organosiloxane polycondensate according to claim 1, wherein said ratios of (I):(III) are in the range from 50:50 to 10:90 mol %.

3. The shaped organosiloxane polycondensate according to claim 1, wherein said diameter is 0.05 to 1.5 mm.

4. The shaped organosiloxane polycondensate according to claim 1, wherein said specific surface area is 50 to 800 $m^2/g$.

5. The shaped organosiloxane polycondensate according to claim 1, wherein said bulk density is 100 to 800 g/l.

6. The shaped organosiloxane polycondensate according to claim 1, wherein said shaped organosiloxane polycondensate is a random polycondensate, block polycondensate or mixed polycondensate.

7. The shaped organosiloxane polycondensate according to claim 1, wherein said groups $R^1$ to $R^3$ represent a group of the formula

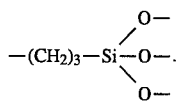

8. A process for the preparation of shaped random organosiloxane polycondensates comprising units of the formula (I):

      (I)

and/or the formula (II):

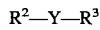      (II);

and the formula (III):

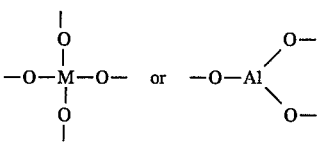      (III)

and optionally units of the formula (IV):

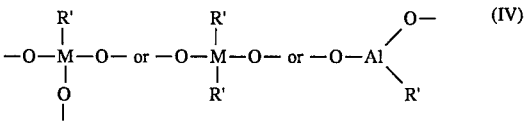      (IV)

in which the ratios (I) to (III) are in the range from 95 to 5 to 5 to 95 mol % or (II) to (III) or the sum of (I) plus (II) to (III) are from 90:10 to 10:90 mol % and with the ratio of the sum of (I), (II) and (III) to (IV) of 100 to 0 to 50 to 50 mol %, wherein $R^1$ to $R^3$ are identical or different and represent a group of the formula (V):

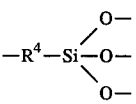      (V)

$R^4$ being bonded directly to the group X or Y and representing a linear or branched, fully saturated or unsaturated alkylene group with 1 to 10 carbon atoms, a cycloalkylene group with 5 to 8 carbon atoms, a phenylene group or a unit of the formula

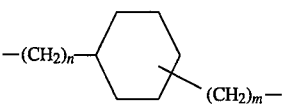

or

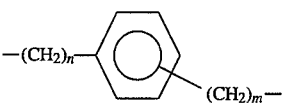

in which n is a number from 1 to 6 and represents the number of methylene groups adjacent to X or Y, and m is a number from 0 to 6, wherein M is a Si, Ti or Zr atom, and R' is a linear or branched alkyl group with 1 to 5 carbon atoms or a phenyl group, and X in formula (I) represents —H, —Cl, —Br, —I, —CN, —SCN, —$N_3$, —OR", —SH, —COOH, —P($C_6H_5$)$_2$, —$NH_2$, —N($CH_3$)$_2$, —N($C_2H_5$)$_2$, —NH—($CH_2$)$_2$—$NH_2$, —NH—($CH_2$)$_2$—NH—($CH_2$)$_2$—$NH_2$, —NH—C(S)—$NR_2$", —NH—C(O)—$NR_2$", —NR"—C(S)—$NR_2$", —O—C(O)—C($CH_3$)=$CH_2$, —CH=$CH_2$, —$CH_2$—CH=$CH_2$, —$CH_2$—$CH_2$—CH=$CH_2$ or and Y in formula (II) represents

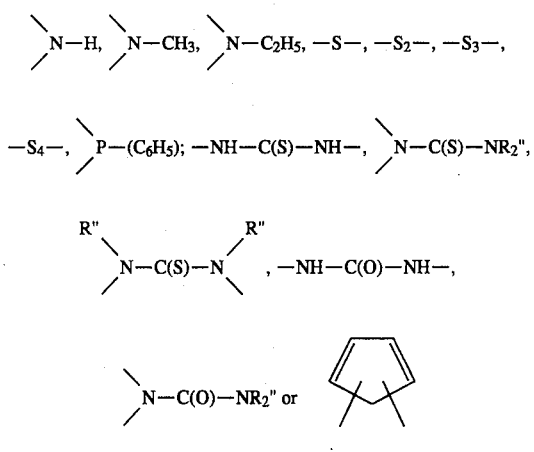

wherein R" is H or represents a linear or branched alkyl group with 1 to 5 carbon atoms, wherein said shaped organosiloxane polycondensate is a macroscopic spherical particle with a diameter of 0.01 to 2.5 mm, a specific surface area of 0.01 to 1000 m²/g, a specific pore volume of 0.01 to 5 ml/g, and a bulk density of 50 to 1000 g/l;

with the provisio that said shaped organosiloxane polycondensate is not a formed, spherical, polymeric metal complex of iron, cobalt, nickel, ruthenium, rhodium, palladium, osmium, iridium and/or platinum formed from the reaction of hydrous or anhydrous compounds of iron, cobalt, nickel, ruthenium, rhodium, palladium, osmium, iridium and/or platinum with the components of the organosiloxane; and with the provisio that said shaped organosiloxane polycondensate does not contain components of $NR_3$ wherein the R groups are identical or different and represent a group of the formula:

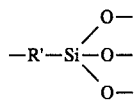

R' being bonded directly to the nitrogen atom and represents a linear or branched alkylene group with 1 to 10 carbon atoms, a cycloalkylene group with 5 to 8 carbon atoms, or a unit of the formula

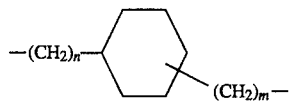

or

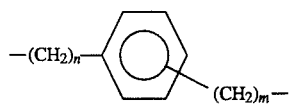

in which n is a number from 1 to 6 and represents the number of methylene groups bonded to nitrogen and m is a number from 0 to 6;

said process comprising:

(a) dissolving (i) components of the formulas (VI) to (VIII):

$$X-R^5 \tag{VI}$$

$$R^6-Y-R^7 \tag{VII}$$

$$M(OR^8)_{2-4}R'_{0-2}$$

or $$Al(OR^8)_{2-3}R'_{0-1} \tag{VIII}$$

corresponding to the stoichiometric composition of the organosiloxane being prepared, wherein $R^5$ to $R^7$ are identical or different and each represents a group of the formula (IX):

$$-R^4-Si(OR^9)_3 \tag{IX}$$

X, Y, R', M and $R^4$ are each defined as in the formulas (I) to (V) and $R^8$ and $R^9$ represent a linear or branched alkyl group with 1 to 5 carbon atoms, in (ii) a solvent which is predominantly water-miscible but which dissolves the silane components, to form a solution;

(b) adding an amount of water, which is at least sufficient for complete hydrolysis and condensation, as well as optionally a hydrolysis and condensation catalyst which is HCl, $H_3PO_4$, $CH_3COOH$, $NH_3$, or $NR_3'''$ wherein R''' represents an alkyl group which contains 1 to 6 carbon atoms, as the pure substance or in aqueous solution, to said solution with stirring to form a reaction mixture;

(c) allowing said reaction mixture to gel with further stirring at a specific temperature in the range from room temperature to 200° C.; and adding, at the start of gelling or up to one hour afterwards, 10 to 2000% by weight, with reference to the total amount of silane components used, of a predominantly water-immiscible solvent which dissolves and dilutes the reaction mixture being gelled;

(d) homogenizing the product of (c) and adding 10 to 2000% by weight, with reference to the total amount of silane components used, of water immediately or within a time interval of up to 3 hours later, optionally increasing the originally fixed temperature; the siloxane-containing organic phase is dispersed in the liquid two-phase system and the solid which is formed after hardening of the droplets, resulting from said siloxane-containing organic phase being dispersed in said liquid two-phase system, in the shape of spheres is separated from the liquid phase after a sufficient reaction time, at room temperature to 250° C., then optionally: purifying by extraction, drying at room temperature to 250° C., optionally under a protective gas or under vacuum, and then annealing and/or classifying;

with the provisio that said process does not involve the reaction of hydrous or anhydrous compounds of iron, cobalt, nickel, ruthenium, rhodium, palladium, osmium, iridium and/or platinum with the components of the organosiloxane; and with the provisio that said process does not involve components of $NR_3$ wherein the R groups are identical or different and represent a group of the formula:

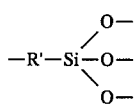

R' being bonded directly to the nitrogen atom and represents a linear or branched alkylene group with 1 to 10 carbon atoms, a cycloalkylene group with 5 to 8 carbon atoms, or a unit of the formula

or

in which n is a number from 1 to 6 and represents the number of methylene groups bonded to nitrogen and m is a number from 0 to 6.

9. The process according to claim 8, wherein the amount of said predominantly water-immiscible solvent is 50 to 500% by weight.

10. The process according to claim 8, wherein the amount of said water is 50 to 500% by weight.

11. The process according to claim 8, wherein said predominantly water-miscible solvent is at least one member selected from the group consisting of methanol, ethanol, n-propanol, i-propanol, n-butanol, i- butanol, n-pentanol, and mixtures thereof.

12. The process according to claim 8, wherein said predominantly water-immiscible solvent is at least one member selected from the group consisting of a linear or branched alcohol with 8 to 12 carbon atoms, toluene, o-xylene, m-xylene, p-xylene, tert-butyl-methyl-ether, and mixtures thereof.

13. The process according to claim 8, wherein one or more of said silanes of the formulas (VI) to (VIII) is only introduced during or shortly after gelling, optionally in said predominantly water-immiscible solvent.

14. The process according to claim 8, wherein some of said components (VI) to (VIII), combined or each separately, are pre-condensed and then added to said reaction mixture.

15. The process according to claim 8, further comprising after-treating the shaped but not dried organopolysiloxane condensate obtained by subjecting said shaped but not dried organosiloxane condensate to a thermal treatment for one hour to one week at 50° to 300° C. in the liquid phase in the presence of at least the component water or else in the two-phase system.

16. The process according to claim 15, wherein said thermal treatment is at 100° to 200° C.

17. The process according to claim 15, wherein said after-treating is performed in the presence of an acid or basic catalyst.

18. The process according to claim 17, wherein said catalyst is ammonia.

19. The process according to claim 8, wherein said predominantly water-immiscible solvent is at least one member selected from the group consisting of a linear alcohol with 8 to 18 carbon atoms, a branched alcohol with 8 to 18 carbon atoms, phenol, linear symmetric dialkyl ether, linear symmetric dialkyl diether, linear symmetric dialkyl trierher, linear asymmetric dialkyl ether, linear asymmetric dialkyl diether, linear asymmetric dialkyl triether, branched symmetric dialkyl ether, branced symmetric dialkyl diether, branched symmetric dialkyl triether, branched asymmetric dialkyl ether, branched asymmetric dialkyl diether, branched asymmetric dialkyl triether, chlorinated hydrocarbon, fluorinated hydrocarbon, aromatic compounds, mixture of aromatic compounds substituted with one or more alkyl groups, symmetric ketones which are predominantly immiscible with water, and asymmetric ketones which are predominantly immiscible with water.

20. The shaped organosiloxane polycondensate according to claim 1, wherein said shaped organosiloxane polycondensate has a pore diameter of 0.01 to more than 1000 nm.

21. The shaped organosiloxane polycondensate according to claim 1 consisting essentially of units of the formula (I):

$$X-R^1 \qquad (I)$$

and/or the formula (II):

$$R^2-Y-R^3 \qquad (II);$$

and the formula (III):

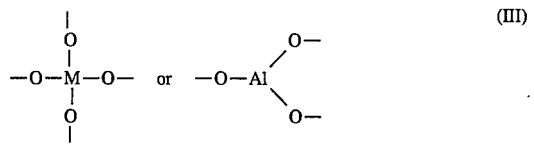

and optionally units of the formula (IV):

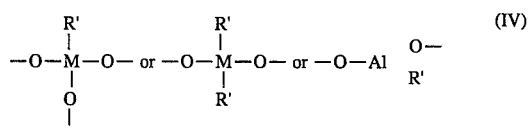

in which the ratios (I):(III) are in the range from 95:5 to 5:95 mol % or (II):(III) or the sum of (I) plus (II):(III) are from 90:10 to 10:90 mol % and with the ratio of the sum of (I), (II) and (III):(IV) of 100:0 to 50:50 mol %, wherein $R^1$ to $R^3$ are identical or different and represent a group of the formula (V):

$R^4$ being bonded directly to the group X or Y and representing a linear or branched, fully saturated or unsaturated alkylene group with 1 to 10 carbon atoms, a cycloalkylene group with 5 to 8 carbon atoms, a phenylene group or a unit of the formula

or

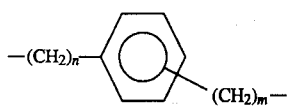

in which n is a number from 1 to 6 and represents the number of methylene groups adjacent to X or Y, and m is a number from 0 to 6, wherein M is a Si, Ti or Zr atom, and R' is a linear or branched alkyl group with 1 to 5 carbon atoms or a phenyl group, and X in formula (I) represents —H, —Cl, —Br, —I, —CN, —SCN, —N$_3$, —OR",
—SH, —COOH, —P(C$_6$H$_5$)$_2$, —NH$_2$, —N(CH$_3$)$_2$,
—N(C$_2$H$_5$)$_2$, —NH—(CH$_2$)$_2$—NH$_2$, —NH—
(CH$_2$)$_2$—NH—(CH$_2$)$_2$—NH$_2$, —NH—C(S)—NR$_2$",
—NH—C(O)—NR$^2$ ", —NR"—C(S)—NR$_2$",
—O—C(O)—C(CH$_3$)=CH$_2$, —CH=CH$_2$, —CH$_2$—
CH=CH$_2$, —CH$_2$—CH$_2$—CH=CH$_2$, or

and Y in formula (II) represents

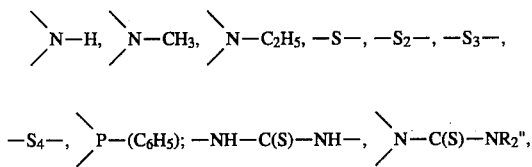

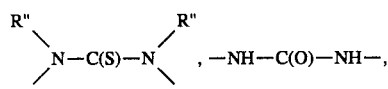

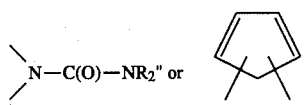

wherein R" is H or represents a linear or branched alkyl group with 1 to 5 carbon atoms, wherein said shaped organosiloxane polycondensate is a macroscopic spherical particle with a diameter of 0.01 to 2.5 mm, a specific surface area of 0.01 to 1000 m$^2$/g, a specific pore volume of 0.01 to 5 ml/g, and a bulk density of 50 to 1000 g/l;

with the proviso that said shaped organosiloxane polycondensate is not a formed, spherical, polymeric metal complex of iron, cobalt, nickel, ruthenium, rhodium, palladium, osmium, iridium and/or platinum formed from the reaction of hydrous or anhydrous compounds of iron, cobalt, nickel, ruthenium, rhodium, palladium, osmium, iridium and/or platinum with the components of the organosiloxane; and with the proviso that said shaped organosiloxane polycondensate does not contain components of NR$_3$ wherein the R groups are identical or different and represent a group of the formula:

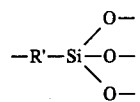

R' being bonded directly to the nitrogen atom and represents a linear or branched alkylene group with 1 to 10 carbon atoms, a cycloalkylene group with 5 to 8 carbon atoms, or a unit of the formula

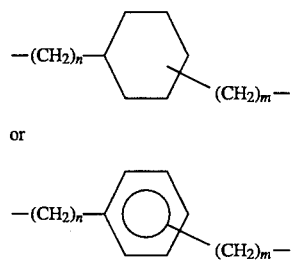

in which n is a number from 1 to 6 and represents the number of methylene groups bonded to nitrogen and m is a number from 0 to 6.

22. The process according to claim 8 with the proviso that said shaped organosiloxane polycondensate is not a formed, spherical, polymeric metal complex of iron, cobalt, nickel, ruthenium, rhodium, palladium, osmium, iridium and/or platinum formed from the reaction of hydrous or anhydrous compounds of iron, cobalt, nickel, ruthenium, rhodium, palladium, osmium, iridium and/or platinum with the components of the organosiloxane, and with the proviso that said shaped organosiloxane polycondensate does not contain components of NR$_3$ wherein the R groups are identical or different and represent a group of the formula:

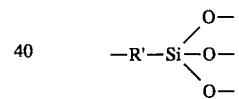

R' being bonded directly to the nitrogen atom and represents a linear or branched alkylene group with 1 to 10 carbon atoms, a cycloalkylene group with 5 to 8 carbon atoms, or a unit of the formula

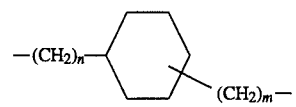

or

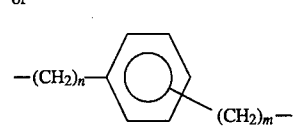

in which n is a number from 1 to 6 and represents the number of methylene groups bonded to nitrogen and m is a number from 0 to 6;

said process consisting essentially of:
(a) dissolving (i) components of the formulas (VI) to (VIII):

X—R$^5$         (VI),

R⁶—Y—R⁷ (VII),

M(OR⁸)₂₋₄R'₀₋₂ or

Al(OR⁸)₂₋₃R'₀₋₁ (VIII)

corresponding to the stoichiometric composition of the organosiloxane being prepared, wherein $R^5$ to $R^7$ are identical or different and each represents a group of the formula (IX):

—R⁴—Si(OR⁹)₃ (IX)

X, Y, R', M and $R^4$ are each defined as in the formulas (I) to (V) and $R^8$ and $R^9$ represent a linear or branched alkyl group with 1 to 5 carbon atoms, in (ii) a solvent which is predominantly water-miscible but which dissolves the silane components, to form a solution;

(b) adding an amount of water, which is at least sufficient for complete hydrolysis and condensation, as well as optionally a hydrolysis and condensation catalyst which is HCl, H₃PO₄, CH₃COOH, NH₃, or NR₃''' wherein R''' represents an alkyl group which contains 1 to 6 carbon atoms, as the pure substance or in aqueous solution, to said solution with stirring to form a reaction mixture;

(c) allowing said reaction mixture to gel with further stirring at a specific temperature in the range from room temperature to 200° C.; and adding, at the start of gelling or up to one hour afterwards, 10 to 2000% by weight, with reference to the total amount of silane components used, of a predominantly water-immiscible solvent which dissolves and dilutes the reaction mixture being gelled;

(d) homogenizing the product of (c) and adding 10 to 2000% by weight, with reference to the total amount of silane components used, of water immediately or within a time interval of up to 3 hours later, optionally increasing the originally fixed temperature; the siloxane-containing organic phase is dispersed in the liquid two-phase system and the solid which is formed after hardening of the droplets, resulting from said siloxane-containing organic phase being dispersed in said liquid two-phase system, in the shape of spheres is separated from the liquid phase after a sufficient reaction time, at room temperature to 250° C., then optionally: purifying by extraction, drying at room temperature to 250° C., optionally under a protective gas or under vacuum, and then annealing and/or classifying;

with the provisio that said process does not involve the reaction of hydrous or anhydrous compounds of iron, cobalt, nickel, ruthenium, rhodium, palladium, osmium, iridium and/or platinum with the components of the organosiloxane; and with the provisio that said process does not involve components of NR₃ wherein the R groups are identical or different and represent a group of the formula:

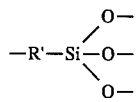

R' being bonded directly to the nitrogen atom and represents a linear or branched alkylene group with 1 to 10 carbon atoms, a cycloalkylene group with 5 to 8 carbon atoms, or a unit of the formula

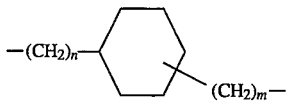

or

in which n is a number from 1 to 6 and represents the number of methylene groups bonded to nitrogen and m is a number from 0 to 6.

23. A process for the preparation of shaped random organosiloxane polycondensates comprising units of the formula (I):

X—R¹ (I)

and/or the formula (II):

R²—Y—R³ (II);

and the formula (III):

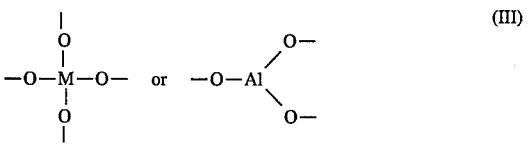 (III)

and optionally units of the formula (IV):

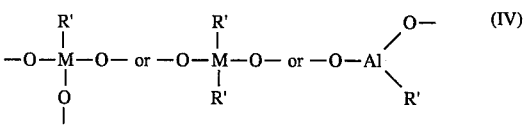 (IV)

in which the ratios (I) to (III) are in the range from 95 to 5 to 5 to 95 mol % or (II) to (III) or the sum of (I) plus (II) to (III) are from 90:10 to 10:90 mol % and with the ratio of the sum of (I), (II) and (III) to (IV) of 100 to 0 to 50 to 50 mol %, wherein $R^1$ to $R^3$ are identical or different and represent a group of the formula (V):

 (V)

$R^4$ being bonded directly to the group X or Y and representing a linear or branched, fully saturated or unsaturated alkylene group with 1 to 10 carbon atoms, a cycloalkylene group with 5 to 8 carbon atoms, a phenylene group or a unit of the formula

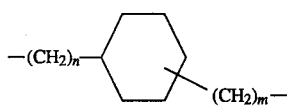

or

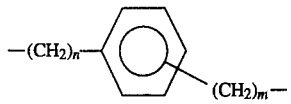

in which n is a number from 1 to 6 and represents the number of methylene groups adjacent to X or Y, and m is a number from 0 to 6, wherein M is a Si, Ti or Zr atom, and R' is a linear or branched alkyl group with 1 to 5 carbon atoms or a phenyl group, and X in formula (I) represents —H, —Cl, —Br, —I, —CN, —SCN, —$N_3$, —OR", —SH, —COOH, —P($C_6H_5$)$_2$, —$NH_2$, —N($CH_3$)$_2$, —N($C_2H_5$)$_2$, —NH—($CH_2$)$_2$—$NH_2$, —NH—($CH_2$)$_2$—NH—($CH_2$)$_2$—$NH_2$, —NH—C(S)—NR$_2$", —NH—C(O)—NR$_2$", —NR"—C(S)—NR$_2$", —O—C(O)—C($CH_3$)=$CH_2$, —CH=$CH_2$, —$CH_2$—CH=$CH_2$, —$CH_2$—$CH_2$—CH=$CH_2$ or

and Y in formula (II) represents

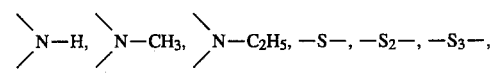

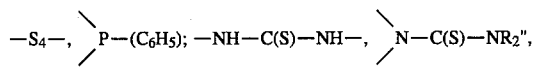

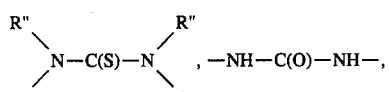

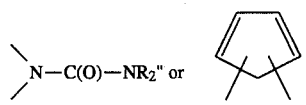

wherein R" is H or represents a linear or branched alkyl group with 1 to 5 carbon atoms, wherein said shaped organosiloxane polycondensate is a macroscopic spherical particle with a diameter of 0.01 to 2.5 mm, a specific surface area of 0.01 to 1000 m²/g, a specific pore volume of 0.01 to 5 ml/g, and a bulk density of 50 to 1000 g/l;

with the provisio that said shaped organosiloxane polycondensate is not a formed, spherical, polymeric metal complex of iron, cobalt, nickel, ruthenium, rhodium, palladium, osmium, iridium and/or platinum formed from the reaction of hydrous or anhydrous compounds of iron, cobalt, nickel, ruthenium, rhodium, palladium, osmium, iridium and/or platinum with the components of the organosiloxane; and with the provisio that said shaped organosiloxane polycondensate does not contain components of $NR_3$ wherein the R groups are identical or different and represent a group of the formula:

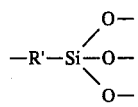

R' being bonded directly to the nitrogen atom and represents a linear or branched alkylene group with 1 to 10 carbon atoms, a cycloalkylene group with 5 to 8 carbon atoms, or a unit of the formula

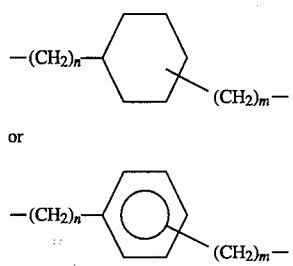

which n is a number from 1 to 6 and represents the number of methylene groups bonded to nitrogen and m is a number from 0 to 6;

said process comprising:

(a) dissolving (i) components of the formulas (VI) to (VIII):

X—R$^5$ (VI),

R$^6$—Y—R$^7$ (VII)

M(OR$^8$)$_{2-4}$R'$_{0-2}$ or

Al(OR$^8$)$_{2-3}$R'$_{0-1}$ (VIII)

corresponding to the stoichiometric composition of the organosiloxane being prepared, wherein R$^5$ to R$^7$ are identical or different and each represents a group of the formula (IX):

—R$^4$—Si(OR$^9$)$_3$ (IX)

X, Y, R', M and R$^4$ are each defined as in the formulas (I) to (V) and R$^8$ and R$^9$ represent a linear or branched alkyl group with 1 to 5 carbon atoms, in (ii) a solvent which is predominantly water-miscible but which dissolves the silane components, to form a solution or in a blend of said predonminately water-miscible solvent and a water-immiscible solvent;

(b) adding an amount of water, which is at least sufficient for complete hydrolysis and condensation, as well as optionally a hydrolysis and condensation catalyst which is HCl, $H_3PO_4$, $CH_3COOH$, $NH_3$, or $NR_3'''$ wherein R''' represents an alkyl group which contains 1 to 6 carbon atoms, as the pure substance or in aqueous solution, to said solution with stirring to form a reaction mixture;

(c) allowing said reaction mixture to gel with further stirring at a specific temperature in the range from room temperature to 200° C.; and optionally adding, at the start of gelling or up to one hour afterwards, a predominantly water-immiscible solvent which dissolves and dilutes the reaction mixture being gelled such that the total water-immiscible solvent from (a) and (c) is 10 to 2000%, by weight, with reference to the total amount of silane components used;

(d) homogenizing the product of (c) and adding 10 to 2000% by weight, with reference to the total amount of silane components used, of water immediately or within a time interval of up to 3 hours later, optionally increasing the originally fixed temperature; the siloxane-containing organic phase is dispersed in the liquid two-phase system and the solid which is formed after hardening of the droplets, resulting from said siloxane-containing organic phase being dispersed in said liquid two-phase system, in the shape of spheres is separated from the liquid phase after a sufficient reaction time, at room temperature to 250° C., then optionally: purifying by extraction, drying at room temperature to 250° C., optionally under a protective gas or under vacuum, and then annealing and/or classifying;

with the provisio that said process does not involve the reaction of hydrous or anhydrous compounds of iron, cobalt, nickel, ruthenium, rhodium, palladium, osmium, iridium and/or platinum with the components of the organosiloxane; and with the provisio that said process does not involve components of $NR_3$ wherein the R groups are identical or different and represent a group of the formula:

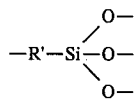

R' being bonded directly to the nitrogen atom and represents a linear or branched alkylene group with 1 to 10 carbon atoms, a cycloalkylene group with 5 to 8 carbon atoms, or a unit of the formula

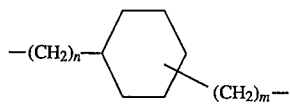

or

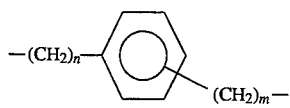

in which n is a number from 1 to 6 and represents the number of methylene groups bonded to nitrogen and m is a number from 0 to 6.

24. A process for the preparation of shaped random organosiloxane polycondensates comprising units of the formula (I):

  (I)

and/or the formula (II):

  (II);

and the formula (III):

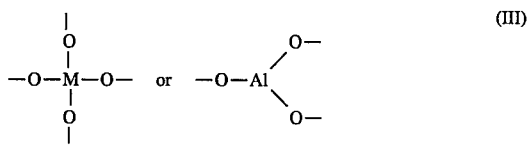 (III)

optionally units of the formula (IV):

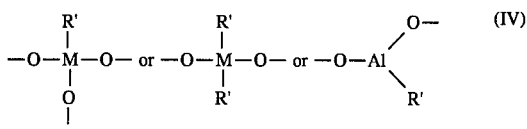 (IV)

in which the ratios (I) to (III) are in the range from 95 to 5 to 5 to 95 mol % or (II) to (III) or the sum of (I) plus (II) to (III) are from 90:10 to 10:90 mol % and with the ratio of the sum of (I), (II) and (III) to (IV) of 100 to 0 to 50 to 50 mol %, wherein $R^1$ to $R^3$ are identical or different and represent a group of the formula (V):

 (V)

$R^4$ bonded directly to the group X or Y and representing a linear or branched, fully saturated or unsaturated alkylene group with 1 to 10 carbon atoms, a cycloalkylene group with 5 to 8 carbon atoms, a phenylene group or a unit of the formula

or

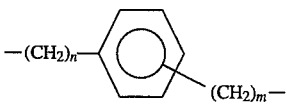

in which n is a number from 1 to 6 and represents the number of methylene groups adjacent to X or Y, and m is a number from 0 to 6, wherein M is a Si, Ti or Zr atom, and R' is a linear or branched alkyl group with 1 to 5 carbon atoms or a phenyl group, and X in formula (I) represents —H, —Cl, —Br, —I, —CN, —SCN, —$N_3$, —OR", —SH, —COOH, —P($C_6H_5$)$_2$, —$NH_2$, —N($CH_3$)$_2$, —N($C_2H_5$)$_2$, —NH—($CH_2$)$_2$—$NH_2$, —NH—($CH_2$)$_2$—NH—($CH_2$)$_2$—$NH_2$, —NH—C(S)—$NR_2$", —NH—C(O)—$NR_2$", —NR"—C(S)—$NR_2$", —O—C(O)—C($CH_3$)=$CH_2$, —CH=$CH_2$, —$CH_2$—CH=$CH_2$, —$CH_2$—$CH_2$—CH=$CH_2$ or

and Y in formula ( II ) represents J $$\begin{matrix}\diagdown\\ \diagup\end{matrix}N-H, \begin{matrix}\diagdown\\ \diagup\end{matrix}N-CH_3, \begin{matrix}\diagdown\\ \diagup\end{matrix}N-C_2H_5, -S-, -S_2-, -S_3-,$$

$$-S_4-, \begin{matrix}\diagdown\\ \diagup\end{matrix}P-(C_6H_5); -NH-C(S)-NH-, \begin{matrix}\diagdown\\ \diagup\end{matrix}N-C(S)-NR_2'',$$

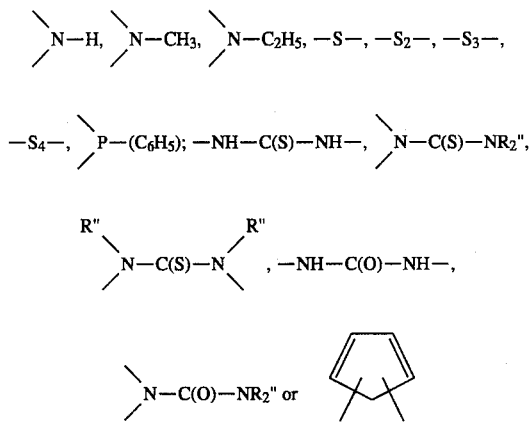

wherein R" is H or represents a linear or branched alkyl group with 1 to 5 carbon atoms, wherein said shaped organosiloxane polycondensate is a macroscopic spherical particle with a diameter of 0.01 to 2.5 mm, a specific surface area of 0.01 to 1000 m²/g, a specific pore volume of 0.01 to 5 ml/g, and a bulk density of 50 to 1000 g/l;

with the provisio that said shaped organosiloxane polycondensate is not a formed, spherical, polymeric metal complex of iron, cobalt, nickel, ruthenium, rhodium, palladium, osmium, iridium and/or platinum formed from the reaction of hydrous or anhydrous compounds of iron, cobalt, nickel, ruthenium, rhodium, palladium, osmium, iridium and/or platinum with the components of the organosiloxane; and with the provisio that said shaped organosiloxane polycondensate does not contain components of NR$_3$ wherein the R groups are identical or different and represent a group of the formula:

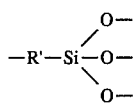

R' being bonded directly to the nitrogen atom and represents a linear or branched alkylene group with 1 to 10 carbon atoms, a cycloalkylene group with 5 to 8 carbon atoms, or a unit of the formula

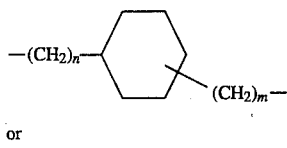

or

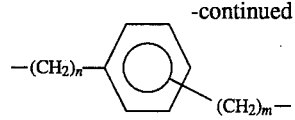

in which n is a number from 1 to 6 and represents the number of methylene groups bonded to nitrogen and m is a number from 0 to 6;

said process comprising:

(a) dissolving (i) components of the formulas (VI) to (VIII):

$$X-R^5 \qquad (VI),$$

$$R^6-Y-R^7 \qquad (VII),$$

$$M(OR^8)_{2-4}R'_{0-2}$$

or $$Al(OR^8)_{2-3}R'_{0-1} \qquad (VIII)$$

corresponding to the stoichiometric composition of the organosiloxane being prepared, wherein $R^5$ to $R^7$ are identical or different and each represents a group of the formula (IX):

$$-R^4-Si(OR^9)_3 \qquad (IX)$$

X, Y, R', M and $R^4$ are each defined as in the formulas (I) and (V) and $R^8$ and $R^9$ represent a linear or branched alkyl group with 1 to 5 carbon atoms, in (ii) a solvent which is predominantly water-miscible but which dissolves the silane components, to form a solution;

(b) adding an amount of water, which is at least sufficient for complete hydrolysis and condensation, as well as optionally a hydrolysis and condensation catalyst which is HCl, H$_3$PO$_4$, CH$_3$COOH, NH$_3$, or NR$_3$''' wherein R''' represents an alkyl group which contains 1 to 6 carbon atoms, as the pure substance or in aqueous solution, to said solution with stirring to form a reaction mixture;

(c) allowing said reaction mixture to gel with further stirring at a specific temperature in the range form room temperature to 200° C.; and adding, at the start of gelling or up to one hour afterwards, 10 to 2000% by weight, with reference to the total amount of silane components used, of a predominantly water-immiscible solvent which dissolves and dilutes the reaction mixture being gelled;

(d) homogenizing the product of (c) to form a homogeneous mixture and adding 10 to 2000% by weight, with reference to the total amount of silane components used, of water immediately or within a time interval of up to 3 hours later, optionally increasing the originally fixed temperature; the siloxane-containing organic phase is dispersed in the liquid two-phase system and the solid which is formed after hardening of the droplets, resulting from said siloxane-containing organic phase being dispersed in said liquid two-phase system, in the shape of spheres is separated from the liquid phase after a sufficient reaction time, at room temperature to 250° C., then optionally: purifying by extraction, drying at room temperature to 250° C., optionally under a protective gas or under vacuum, and then annealing and/or classifying;

wherein said hydrolysis and condensation catalyst and/or components (VI) to (VIII) are gelled separately first, homogenized with said predominantly water-immiscible solvent and then added to form a solution;

with the provisio that said process does not involve the reaction of hydrous or anhydrous compounds of iron, cobalt, nickel, ruthenium, rhodium, palladium, osmium, iridium and/or platinum with the components of the organosiloxane; and with the provisio that said process does not involve components of $NR_3$ wherein the R groups are identical or different and represent a group of the formula:

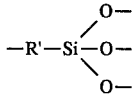

R' being bonded directly to the nitrogen atom and represents a linear or branched alkylene group with 1 to 10 carbon atoms, a cycloalkylene group with 5 to 8 carbon atoms, or a unit of the formula

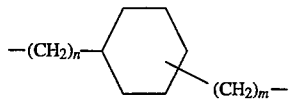

or

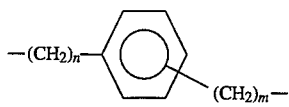

in which n is a number from 1 to 6 and represents the number of methylene groups bonded to nitrogen and m is a number from 0 to 6.

* * * * *